(12) United States Patent
Tajima (10) Patent No.: US 8,840,523 B2
(45) Date of Patent: Sep. 23, 2014

(54) POWER TRANSMISSION DEVICE FOR HYBRID VEHICLE

(75) Inventor: Shigeru Tajima, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 500 days.

(21) Appl. No.: 13/132,165

(22) PCT Filed: Nov. 20, 2009

(86) PCT No.: PCT/JP2009/069747
§ 371 (c)(1),
(2), (4) Date: Jun. 1, 2011

(87) PCT Pub. No.: WO2010/064550
PCT Pub. Date: Jun. 10, 2010

(65) Prior Publication Data
US 2011/0233020 A1  Sep. 29, 2011

(30) Foreign Application Priority Data

Dec. 1, 2008 (JP) ................. 2008-306230

(51) Int. Cl.
*B60K 6/387* (2007.10)
*B60K 6/40* (2007.10)
*B60K 6/50* (2007.10)
*B60W 10/02* (2006.01)
*F16D 21/06* (2006.01)

(52) U.S. Cl.
USPC ................. 477/5; 475/5; 192/48.91

(58) Field of Classification Search
USPC ........... 477/5; 475/5; 74/329; 192/48.8, 48.9, 192/48.91
See application file for complete search history.

(56) References Cited

U.S. PATENT DOCUMENTS

| 4,411,171 A * | 10/1983 | Fiala ................................ 475/5 |
| 6,059,059 A | 5/2000 | Schmidt-Brucken |
| 6,705,416 B1 | 3/2004 | Glonner et al. |
| 6,962,545 B2 * | 11/2005 | Larkin .............................. 475/5 |

(Continued)

FOREIGN PATENT DOCUMENTS

| JP | 8-238946 A | 9/1996 |
| JP | 2942533 B2 | 6/1999 |

(Continued)

OTHER PUBLICATIONS

European Search Report dated Apr. 17, 2012, issued in corresponding European Patent Application No. 09830317.5 (6 pages).

(Continued)

*Primary Examiner* — Jacob S. Scott
(74) *Attorney, Agent, or Firm* — Westerman, Hattori, Daniels & Adrian, LLP (57) ABSTRACT

A power transmission device for hybrid vehicle 10, which is provided with an engine 1, a first motor 21 and a second motor 22, includes a flywheel 13 intervening between the crankshaft 11 of the engine 1 and the driven shaft 12 driven by the crankshaft 11, the first clutch 31 disposed at the engine 1 side of the flywheel 13 for disconnecting and connecting power transmission between the engine 1 and the first motor 21, the second clutch 32 disposed at the driven shaft 12 side of the flywheel 13 for disconnecting and connecting power transmission between the engine 1 and the driven shaft 12, and a shifter 73 for disconnecting and connecting power transmission between the second motor 22 and the driven shaft 12.

14 Claims, 9 Drawing Sheets (56) References Cited

U.S. PATENT DOCUMENTS

| | | | |
|---|---|---|---|
| 7,631,739 B2* | 12/2009 | Enstrom | 192/48.8 |
| 7,832,537 B2* | 11/2010 | Blessing et al. | 192/48.91 |
| 2006/0096795 A1 | 5/2006 | Grundl et al. | |
| 2007/0119678 A1 | 5/2007 | Houle et al. | |

FOREIGN PATENT DOCUMENTS

| WO | 00/63041 A1 | 10/2000 |
|---|---|---|
| WO | 2004/037594 A1 | 5/2004 |
| WO | 2004/106096 A1 | 12/2004 |
| WO | 2007/042109 A1 | 4/2007 |

OTHER PUBLICATIONS

International Search Report for PCT/JP2009/069747 dated Jan. 19, 2010.

Chinese Office Action issued May 21, 2013, issued in corresponding Chinese Patent Application No. 200980146381.1.

\* cited by examiner

POWER TRANSMISSION DEVICE FOR HYBRID VEHICLE

TECHNICAL FIELD

The present invention relates to a power transmission device for hybrid vehicle, and in particular, to a power transmission device for hybrid vehicle, which is provided with an internal combustion engine and two electric motors and can be driven by an engine and motors.

BACKGROUND ART

Conventionally, a power transmission device for hybrid vehicle, which is described in, for example, Patent Document 1 has been known as a power transmission device for hybrid vehicle which can be driven by an engine and two motors.

Figure 9:
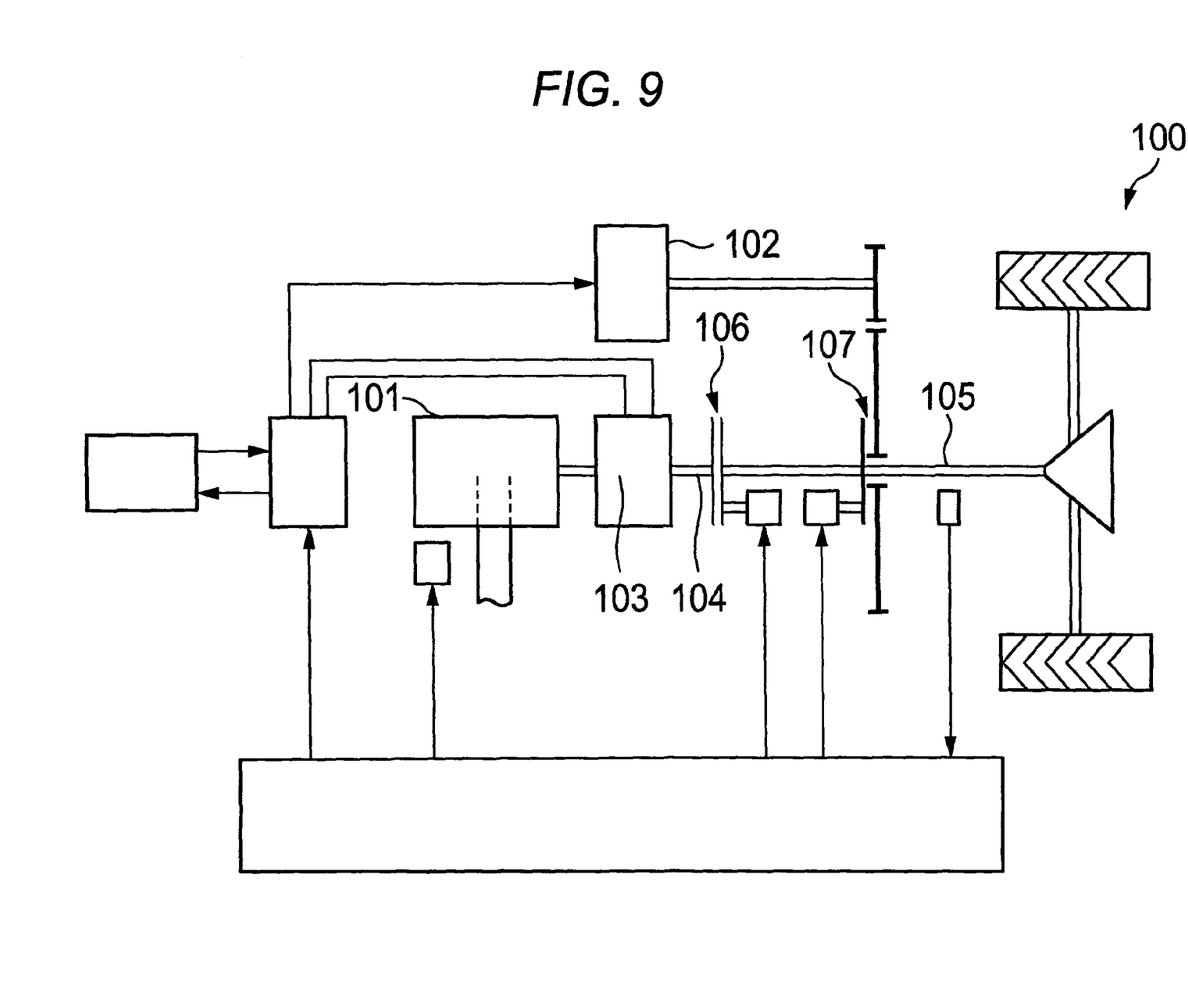
FIG. 9 is a schematic view showing a power transmission device for hybrid vehicle described in Patent Document 1.

For example, a power transmission device for hybrid vehicle 100 according to Patent Document 1 is provided with an engine 101, a first motor 102, and a second motor 103 as described in FIG. 9, wherein the engine 101 is connected directly to the second motor 103, the engine 101, an output shaft 104 from the second motor 103, and a driven shaft 105 are connected to each other via a first clutch 106, and the first motor 102 and the driven shaft 105 are connected to each other via a second clutch 107.

Therefore, when the vehicle is driven by the engine 101, the first motor 102 is prevented from rotating together by connecting the first clutch 106 and disconnecting the second clutch 107. On the contrary, when the vehicle is driven by the first motor 102, the engine 101 and the second motor 103 are prevented from rotating together by disconnecting the first clutch 106 and connecting the second clutch 107.

CITATION LIST

Patent Literature

Patent Literature 1: Japanese Patent No. 2942533

SUMMARY OF THE INVENTION

Problems that the Invention is to Solve

However, in the power transmission device for hybrid vehicle 100 according to Patent Document 1,since the engine 101 is connected directly to the second motor 103, the second motor 103 is rotated together with the engine 101 at all times when the vehicle is driven by the engine 101, whereby the second motor 103 becomes a load, and this becomes a factor hindering improvement in fuel consumption.

The present invention was developed in view of the above-described situation, and it is therefore an object of the present invention to provide a power transmission device for hybrid vehicle, which can prevent two electric motors from rotating together with an internal combustion engine when the internal combustion engine is driven.

Means to Solve the Problem

The above-described object can be implemented by the following configuration.

(1) A power transmission device for hybrid vehicle, including an internal combustion engine, a first electric motor and a second electric motor, includes: a flywheel, disposed between an engine shaft of the internal combustion engine and a driven shaft driven by the engine shaft;

a first disconnecting and connecting unit, disposed at a internal combustion engine side of the flywheel, configured to disconnect and connect power transmission between the internal combustion engine and the first electric motor;

a second disconnecting and connecting unit, disposed at a driven shaft side of the flywheel, configured to disconnect and connect power transmission between the internal combustion engine and the driven shaft; and a connection changing unit configured to disconnect and connect power transmission between the second electric motor and the driven shaft.

(2) The configuration described in (1), further includes a transmission at the driven shaft side of the flywheel, wherein the connection changing unit is a shifter secured at the transmission, the shifter selecting a neutral state where power transmission is interrupted between the second electric motor and the driven shaft, and a speed change state where the second electric motor is connected to the driven shaft with the speed of the second electric motor changed.

(3) In the configuration described in (2), the transmission includes at least two or more speed change gear pairs.

(4) In the configuration described in (1), a friction disk of the first disconnecting and connecting unit and a friction disk of the second disconnecting and connecting unit are provided so as to place and hold the flywheel therebetween; and by controlling the positions of the friction disks, the first disconnecting and connecting unit disconnects and connects power transmission between the internal combustion engine and the first electric motor, and the second disconnecting and connecting unit disconnects and connects power transmission between the internal combustion engine and the driven shaft.

(5) In the configuration described in (1), when a vehicle is reversed, the second electric motor is driven in the reverse direction by disconnecting the second disconnecting and connecting unit and connecting the connection changing unit.

(6) In the configuration described in (1), when running under a high load, the vehicle is caused to run by driving all of the internal combustion engine, the first electric motor and the second electric motor by connecting the first disconnecting and connecting unit, the second disconnecting and connecting unit and the connection changing unit, respectively.

(7) In the configuration described in (1), when decelerating the speed of a vehicle, regenerative power generation is carried out by the second electric motor by connecting the connection changing unit or is carried out by connecting the first disconnecting and connecting unit and the second disconnecting and connecting unit, or both thereof are carried out.

(8) In the configuration described in (1), when the vehicle starts, the vehicle starts by the second electric motor by disconnecting the second disconnecting and connecting unit and simultaneously connecting the connection changing unit.

(9) In the configuration described in (1), when driving the vehicle by the internal combustion engine, the connection changing unit is connected after the number of revolutions of the internal combustion engine is made roughly equal to the number of revolutions transmitted from the second electric motor to the driven shaft when connecting the connection changing unit.

(10) In the configuration described in (1), when the vehicle runs by the second electric motor, the second disconnecting and connecting unit is connected after the number of revolutions transmitted from the second electric motor to the driven shaft is made roughly equal to the number of revolutions of the internal combustion engine when connecting the second disconnecting and connecting unit.

(11) In the configuration described in (1), when the vehicle runs by the internal combustion engine, the first electric motor is driven or the first electric motor is used for regenerative power generation in accordance with the situations by connecting the first disconnecting and connecting unit.

(12) In the configuration described in (1), when starting the internal combustion engine, the internal combustion engine is started by driving the first electric motor by disconnecting the second disconnecting and connecting unit and simultaneously connecting the first disconnecting and connecting unit.

(13) In the configuration described in (1), when a vehicle runs at a constant speed, the first electric motor is used for regenerative power generation by the internal combustion engine by connecting the first disconnecting and connecting unit, and at the same time, the second electric motor is driven for the vehicle to run via an appropriate speed change gear pair by the connection changing unit by disconnecting the second disconnecting and connecting unit.

Effects of the Invention

According to the configuration described in (1), two electric motors can be prevented from rotating together with an internal combustion engine when a vehicle is driven by the internal combustion engine, by disconnecting the first disconnecting and connecting unit, which disconnects and connects the internal combustion engine and the first electric motor, and the connection changing unit, which disconnects and connects the second electric motor and the driven shaft, and connecting the second disconnecting and connecting unit which disconnects and connects the internal combustion engine and the driven shaft. Therefore, it is possible to prevent the load from being increased by rotating together with the electric motors, and to contribute to improvement in fuel consumption.

Also, it is possible to prevent the load from being increased by rotating together with the internal combustion engine and the first electric motor by disconnecting the second disconnecting and connecting unit, which disconnects and connects the internal combustion engine and the driven shaft, and connecting the connection changing unit, which disconnects and connects the second electric motor and the driven shaft, when a vehicle is driven by the second electric motor, wherein it is possible to contribute to improvement in fuel consumption.

In addition, since the first disconnecting and connecting unit and the second disconnecting and connecting unit are disposed at both sides of a flywheel that equalizes changes in rotations of the internal combustion engine, space at both sides of the flywheel can be effectively utilized, wherein space is saved, actuators for controlling the disconnecting and connecting unit can be disposed in one place in comparison with a case where these two disconnecting and connecting unit are disposed separately from each other, and the hydraulic circuits and electric circuits can be simplified.

According to the configuration described in (2), by providing the connection changing unit in a transmission, the torque transmitted from the electric motor to the driven shaft can be regulated by the transmission, and the second electric motor can be downsized.

According to the configuration described in (3), the second electric motor can be efficiently utilized by selecting a speed change gear in accordance with a situation where two or more speed change gear pairs are provided.

According to the configuration described in (4), the first disconnecting and connecting unit and the second disconnecting and connecting unit can be disconnected from and connected to each other by controlling the positions of friction disks of the first disconnecting and connecting unit and the second disconnecting and connecting unit, which are provided so that the flywheel is placed therebetween.

According to the configuration described in (5), since reverse is carried out by using the second electric motor, and electric motors take over starting and reverse, the efficiency of which is inefficient by an internal combustion engine, efficient running can be brought about.

According to the configuration described in (6), efficient running can be brought about by driving all of the internal combustion engine, the first electric motor and the second electric motor when running under a high load.

According to the configuration described in (7), since regenerative power generation is brought about by utilizing either one or both of the first electric motor and the second electric motor, efficient charging can be brought about.

According to the configuration described in (8), since a vehicle can be started by using the second electric motor, starting for which an internal combustion engine is inefficient can be taken over by an electric motor, efficient running can be brought about.

According to the configurations described in (9) and (10), a connecting shock can be prevented by connecting the internal combustion engine to the driven shaft after the number of revolutions of the internal combustion engine matches the number of revolutions transmitted from the second electric motor to the driven shaft.

According to the configuration described in (11), efficient running and charging can be carried out by connecting the first disconnecting and connecting unit when a vehicle is driven by an internal combustion engine and selecting drive or regenerative power generation by the first electric motor in accordance with a situation.

According to the configuration described in (12), since an internal combustion engine can be started by using the first electric motor, the first electric motor functions as a stator motor, wherein there is no need to mount any starter motor, downsizing, lightening in weight, and lowering in costs of the system can be achieved.

According to the configuration described in (13), since so-called series running is carried out, it is possible to respond to the cases where a running load is large when a vehicle runs at a constant speed, and the remaining capacity of the batteries is lowered.

DESCRIPTION OF THE EMBODIMENTS

Hereinafter, a detailed description is given of one embodiment of a power transmission device for hybrid vehicle according to the present invention with reference to the accompanying drawings. Also, the drawings should be viewed based on the direction of reference numerals thereof.

Figure 1:
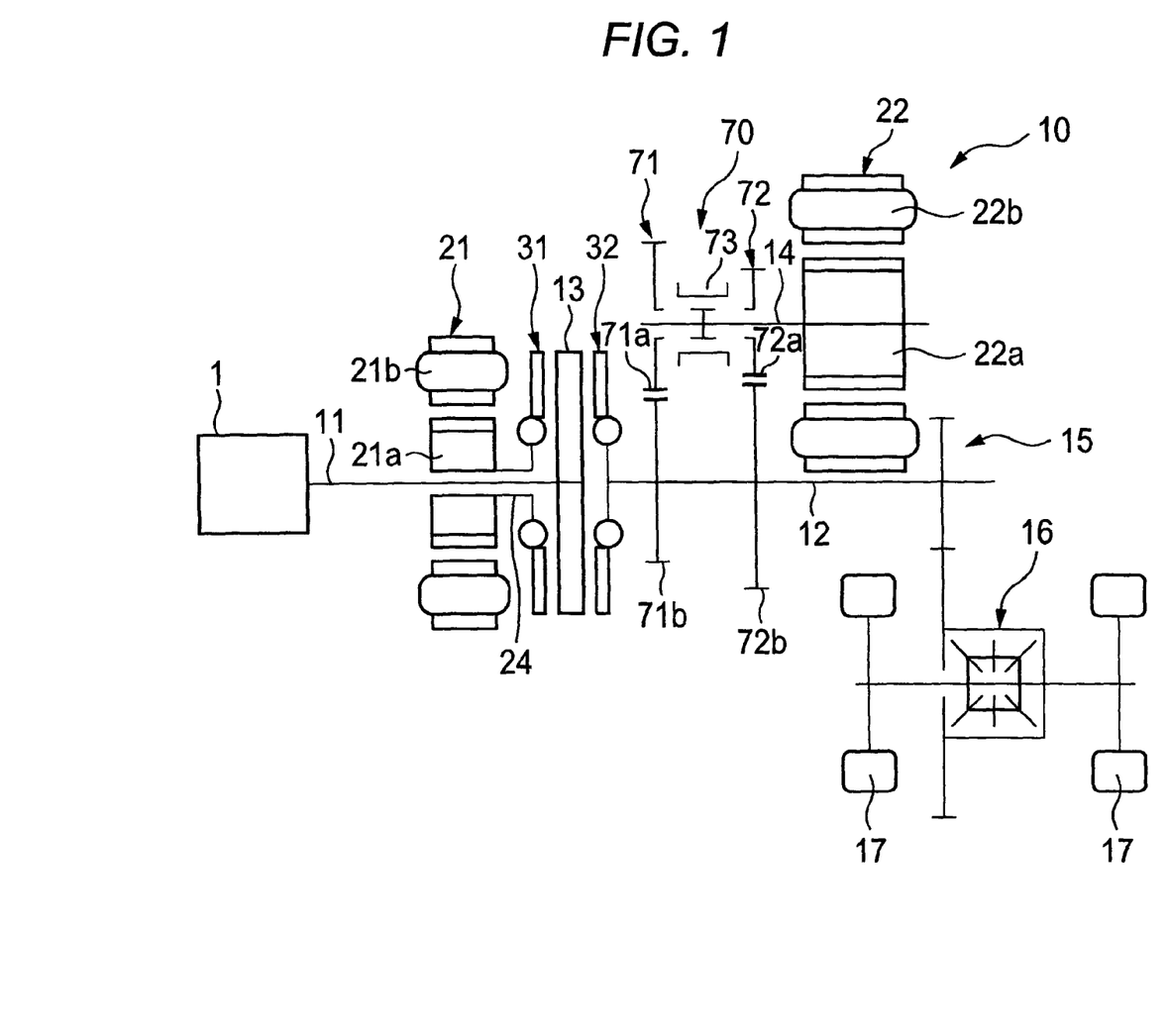
FIG. 1 is a schematic view of a power transmission device for hybrid vehicle according to the present invention.

A power transmission device for hybrid vehicle 10 according to the present embodiment is provided with an engine 1 (internal combustion engine), a flywheel 13 intervened between a crankshaft 11 (engine shaft) of the engine 1 and a driven shaft 12 driven by the crankshaft 11 of the engine 1, a first motor 21 (the first electric motor) disposed at the engine 1 side of the flywheel 13, and a second motor 22 (the second electric motor) disposed at the driven shaft 12 side of the flywheel 13, and the power transmission device for hybrid vehicle 10 is a so-called power transmission device for hybrid vehicle capable of running by the engine 1 and running by the second motor 22.

The first motor 21 is provided with an inner rotor 21*a* and an outer stator 21*b* secured at the outer diameter side so as to be opposed to the inner rotor 21*a* and fixed at the engine casing (not illustrated). The inner rotor 21*a* is disposed coaxially on the crankshaft 11 and is attached to an outer shaft 24 relatively rotatable with respect to the crankshaft 11 via a needle bearing 81. The first clutch 31 (the first disconnecting and connecting unit) described later is secured at the side end part of the flywheel 13 of the outer shaft 24.

The second motor 22 is provided with an inner rotor 22*a* and an outer stator 22*b* secured at the outer diameter side so as to be opposed to the inner rotor 22*a* and fixed at the engine casing (not illustrated). The inner rotor 22*a* is attached to an output shaft 14 extending parallel to the driven shaft 12.

The output shaft 14 of the second motor 22 is connected to the driven shaft 12 via a transmission 70 disposed at the flywheel 13 side, and the second clutch 32 (the second disconnecting and connecting unit) described later is secured at the side end part of the flywheel 13 at the driven shaft 12, and a final gear 15 is provided at the end part of the opposite side thereof. And, it is composed that a drive force of the driven shaft 12 is transmitted to the drive wheel 17 via the final gear 15, and a differential gear 16.

Figure 2:
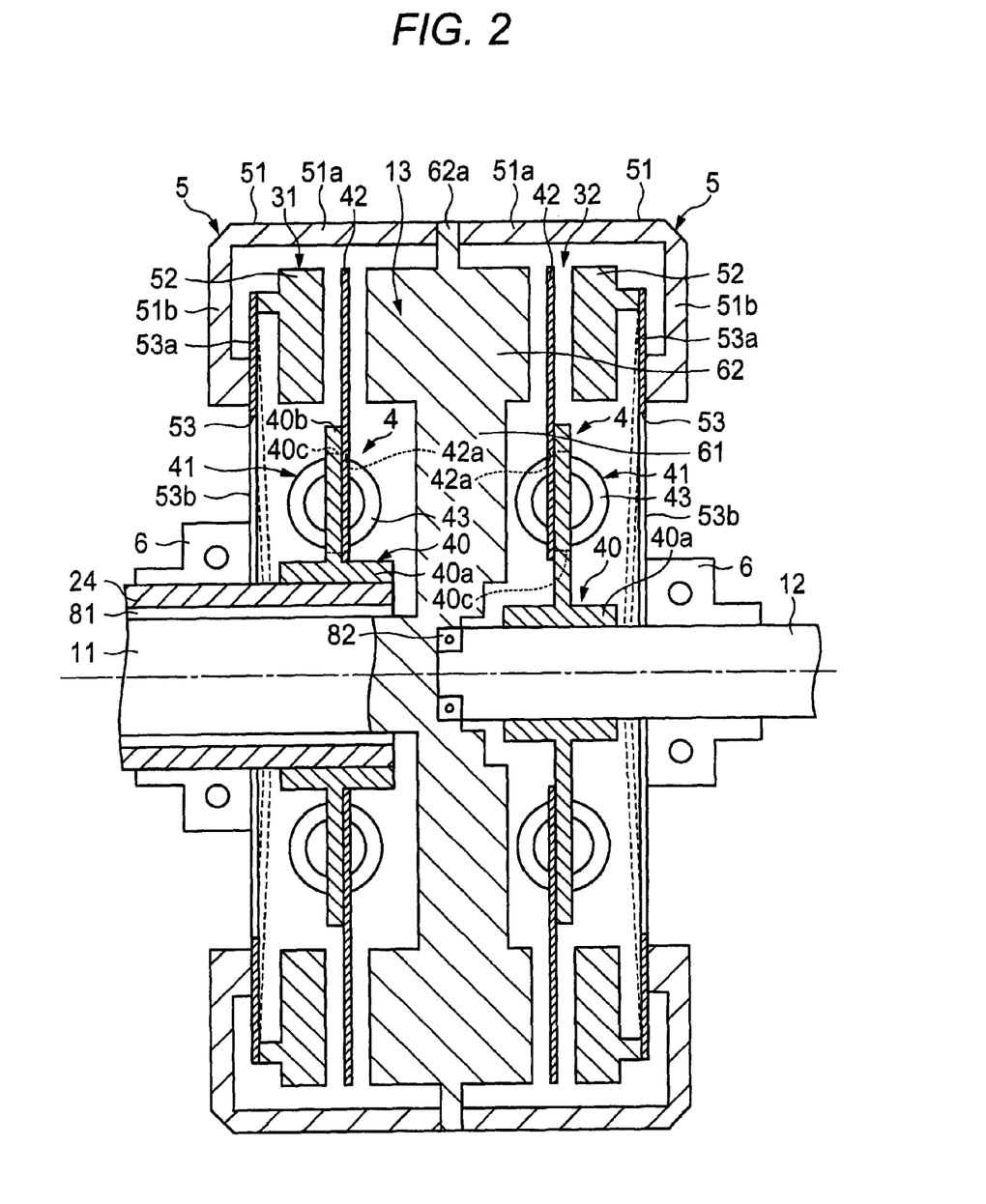
FIG. 2 is a partially enlarged view of the power transmission device for hybrid vehicle, which is shown in FIG. 1.

Here, a description is given of a detailed configuration of the flywheel 13, the first and the second clutches 31 and 32 with reference to FIG. 2.

The flywheel 13 is secured integral with the crankshaft 11 at the side end part of the driven shaft 12 of the crankshaft 11 of the engine 1, and the driven shaft 12 is attached to the inner-diametrical part of the flywheel 13 via the bearing 82 so as to be relatively rotatable to the crankshaft 11.

The flywheel 13 is composed so as to be provided with a disk part 61 extending in the diametrical direction from the crankshaft 11 and an outer-circumferential part 62 projecting parallel to the crankshaft 11 and in both sides in the axial direction from the disk part 61 at the outer edge of the disk part 61.

The first and the second clutches 31 and 32 are, respectively, composed of a friction disk assembly 4 and a clutch cover assembly 5. The first clutch 31 is disposed at the engine 1 side adjacent to the flywheel 13 and the second clutch 32 is disposed at the driven shaft 12 side adjacent to the flywheel 13.

The friction disk assembly 4 is composed of a hub 40, a damper mechanism 41, and a friction disk 42. The hub 40 includes a cylindrical hub part 40*a* extending in the axial direction and a disk-shaped flange part 40*b* extending outside in the diametrical direction from an outer circumferential surface of the hub part 40*a*. The hub part 40*a* of the first clutch 31 is attached to the outer circumferential surface of the outer shaft 24 so as to rotate integral therewith, and the hub part 40*a* of the second clutch 32 is attached to the outer circumferential surface of the driven shaft 12 so as to rotate integral therewith.

The damper mechanism 41 resiliently couples the hub 40 and the friction disk 42 with each other in the rotation direction, and is composed of a flange part 40*b*, a friction disk 42, and a plurality of coil springs 43. A plurality of accommodation parts 40*c*, 42*a* notched to be like a window are, respectively, formed in the flange part 40*b* and the friction disk 42, and the coil spring 43 is accommodated in the respective accommodation parts 40*c* and 42*a* resiliently deformably in the rotation direction.

The friction disk 42 transmits torque by friction engagement, has a disk-shaped form, and is disposed adjacent to the flange part 40*b* of the hub 40.

The clutch cover assembly 5 is composed of a clutch cover 51, a pressure plate 52, and a diaphragm spring 53. The clutch cover 51 includes an outer-circumferential part 51*a* which covers the outer circumferential surface of the flywheel 13 and a sidewall part 51*b* which is bent from the outer-circumferential part 51*a*, extends in the inner-diametrical side, and covers the side surface of the flywheel 13. And the clutch cover 51 is fixed at a projection 62*a* secured on the outer circumferential surface of the flywheel 13 integral with the flywheel 13 from both sides in the axial direction, and internally accommodates the diaphragm spring 53 and the friction disk assembly 4.

The pressure plate 52 is an annular member which places and holds the friction disk 42 between the pressure plate 52 and the flywheel 13, and the pressure plate 52 is provided so as not to rotate relative to the clutch cover 51 but so as to be relatively movable in the axial direction.

The diaphragm spring 53 presses the pressure plate 52 toward the flywheel 13 side, and is provided so as not to rotate relative to the clutch cover 51 but so as to be resiliently deformable in the axial direction. The diaphragm spring 53 includes an annular part 53*a* and a plurality of lever parts 53*b*. The annular part 53*a* presses the pressure plate 52 in the axial direction. The outer-circumferential part of the annular part 53*a* is brought into contact with the pressure plate 52 and the inner-circumferential part thereof is supported in the axial direction by the clutch cover 51. The lever part 53*b* is a part which resiliently deforms the annular part 53*a* in the axial direction and extends inwardly in the radius direction from the annular part 53*a*. The inner-circumferential end part of the lever part 53*b* is movably supported in the axial direction by a release bearing 6.

Next, a description is given of operations of the first and the second clutches 31 and 32.

When the clutch is connected, the lever part 53*b* is pressed to the side, at which the lever part 53*b* is brought into contact with the flywheel 13, by the release bearing 6, and the pressure plate 52 is pressed to the flywheel 13 side by a resilient force of the diaphragm spring 53. As a result, the friction disk 42 is placed and held between the flywheel 13 and the pressure plate 52, thereby connecting the clutch.

As the first clutch 31 is thus connected, power from the crankshaft 11 is transmitted from the friction disk 42, which is placed and held between the flywheel 13 and the pressure plate 52, to the first motor 21 via the coil spring 43, the hub 40 and the outer shaft 24. On the contrary, power from the first motor 21 is transmitted from the outer shaft 24, the hub 40, the coil spring 43, and the friction disk 42 to the engine 1 via the flywheel 13 and the crankshaft 11.

Also, as the second clutch 32 is connected, power from the crankshaft 11 is transmitted from the friction disk 42, which is placed and held between the flywheel 13 and the pressure plate 52, to the driven shaft 12 via the coil spring 43 and the hub 40. On the contrary, power from the driven shaft 12 is transmitted from the hub 40, the coil spring 43 and the friction disk 42 to the engine 1 via the flywheel 13 and the crankshaft 11.

When the first and the second clutches 31 and 32 are disconnected, the tip ends of a plurality of annular parts 53a of the diaphragm spring 53 are pressed to the side, at which the tip ends thereof are separated from the flywheel 13, by the release bearing 6, and the diaphragm spring 53 is resiliently deformed in the axial direction. As a result, the pressing force to the pressure plate 52 is cancelled, the friction disk 42 of the friction disk assembly 4 is not placed and held between the flywheel 13 and the pressure plate 52, wherein the first and the second clutches 31 and 32 are released.

A transmission 70 is a transmission provided with at least two or more speed change gear pairs. Herein, the transmission 70 is provided with a high speed gear pair 71 and a low speed gear pair 72 which have two different speed change ratios.

The high speed gear pair 71 is composed of a high speed drive gear 71a secured at the side opposite to the second motor 22 of the output shaft 14 of the second motor 22 and a high speed driven gear 71b secured at the driven shaft 12 meshed with the high speed drive gear 71a, and the low speed gear pair 72 is composed of a low speed drive gear 72a, the reduction ratio of which is greater than that of the high speed gear pair 71, secured at the opposite side of the high speed drive gear 71a of the high speed gear pair 71 with the shifter 73 (the connection changing unit) placed therebetween and a low speed driven gear 72b secured at the driven shaft 12 meshed with the low speed drive gear 72a.

The shifter 73 is composed so as to select the neutral state in which the second motor 22 and the driven shaft 12 are disconnected, the high speed gear pair 71 and the low speed gear pair 72. At the neutral position, the output shaft 14 of the second motor 22 runs idly, wherein power transmission between the output shaft 14 and the driven shaft 12 is interrupted. At the high speed gear pair connected position, the output shaft 14 of the second motor 22 is connected to the driven shaft 12 via the high speed gear pair 71, and at the low speed gear pair connected position, the output shaft 14 of the second motor 22 is connected to the driven shaft 12 via the low speed gear pair 72, wherein power transmission is thus carried out.

The shifter 73 is connected to the high speed gear pair 71 when running at a high speed rotation with low torque, and on the contrary, is connected to a low speed gear pair 72 when running at a low speed rotation with high torque. Therefore, a large torque can be obtained in accordance with situations by using a small-sized motor, and efficient driving can be brought about.

Next, a description is given of a method for controlling the power transmission device for hybrid vehicle 10 according to the present invention.

Figure 3:
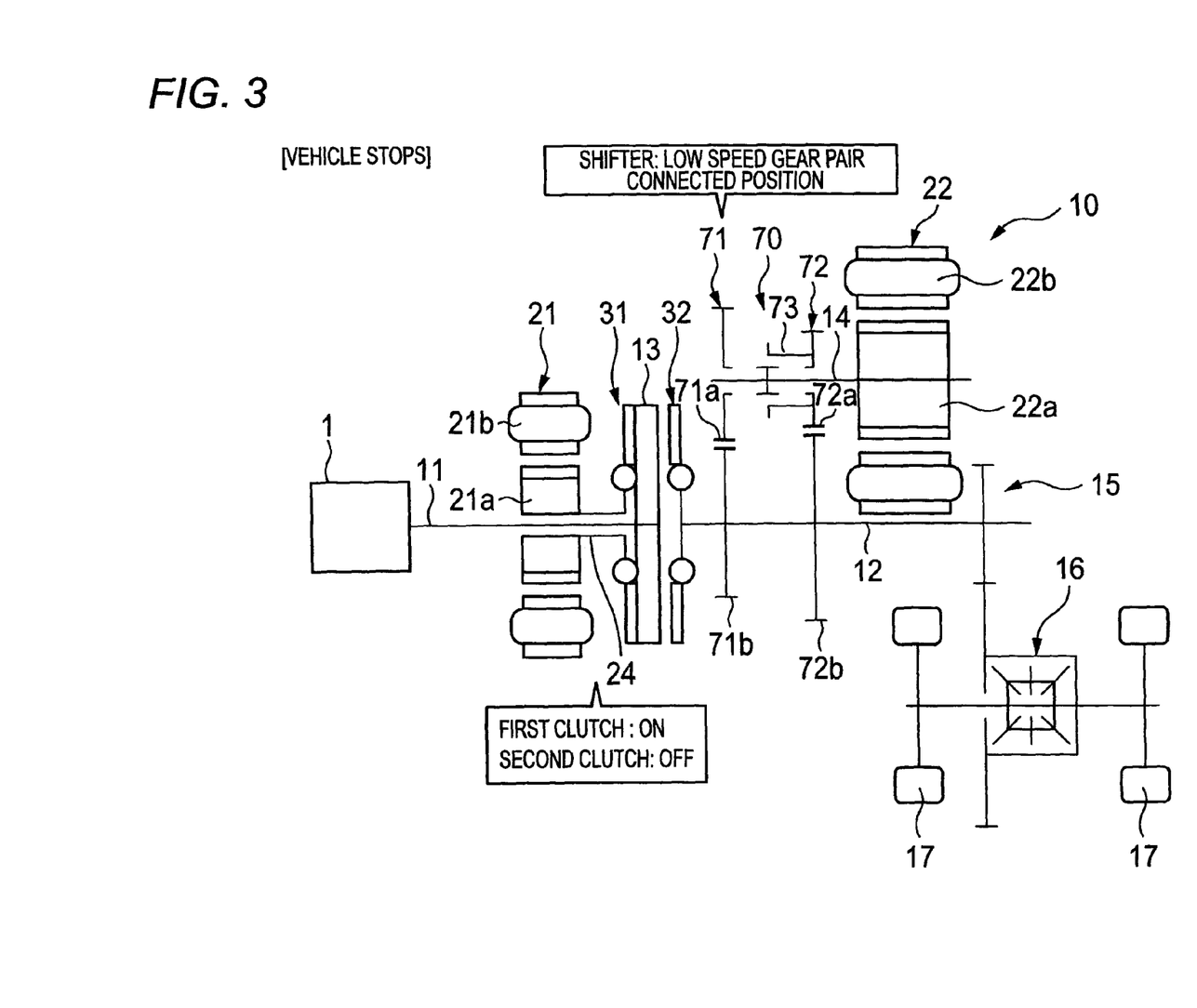
FIG. 3 is a schematic view of a power transmission device for hybrid vehicle when the vehicle stops.
Figure 4:
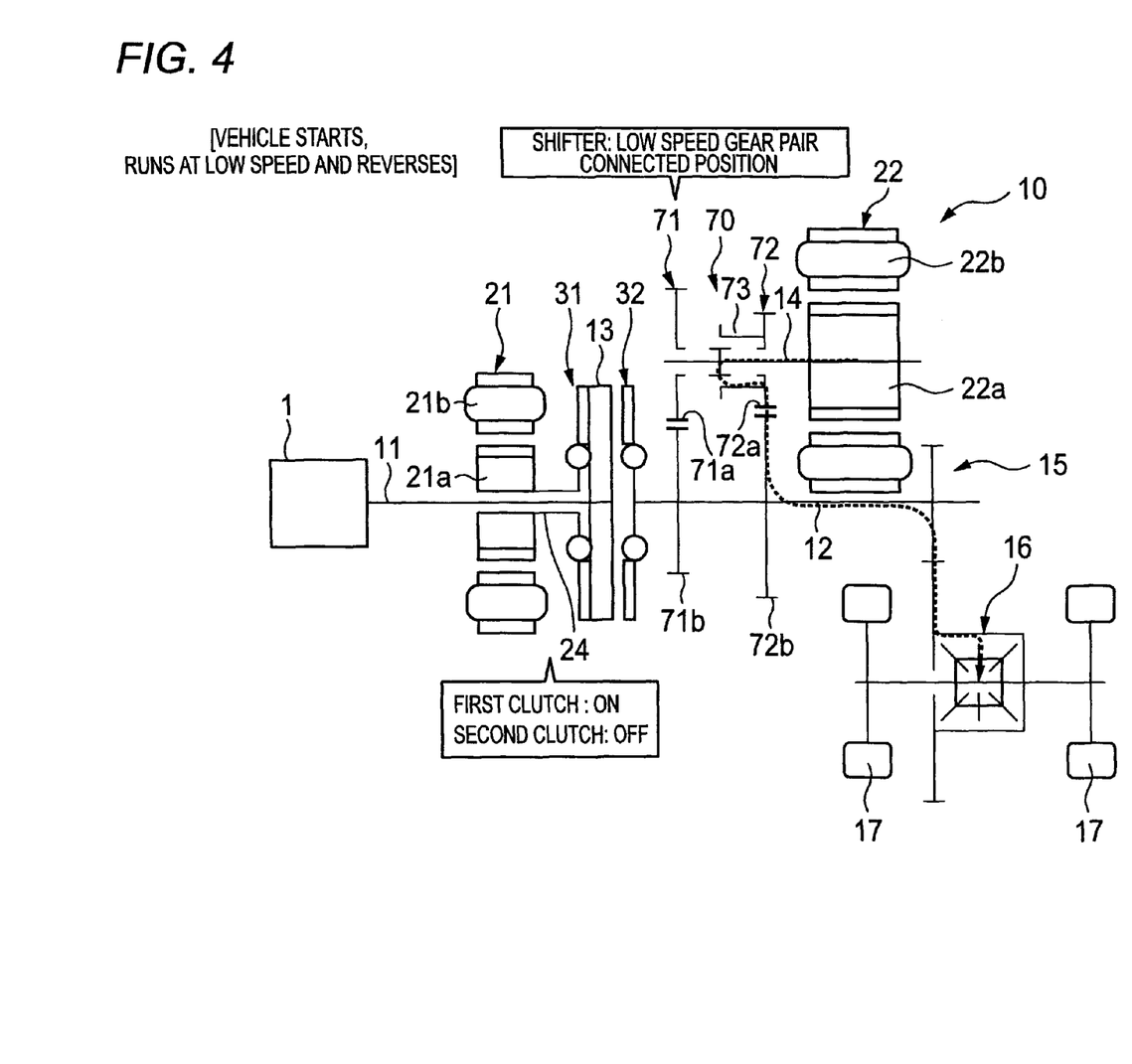
FIG. 4 is a schematic view showing torque transmission of a power transmission device for hybrid vehicle when the vehicle starts, runs at a low speed and runs in the reverse direction.
Figure 5:
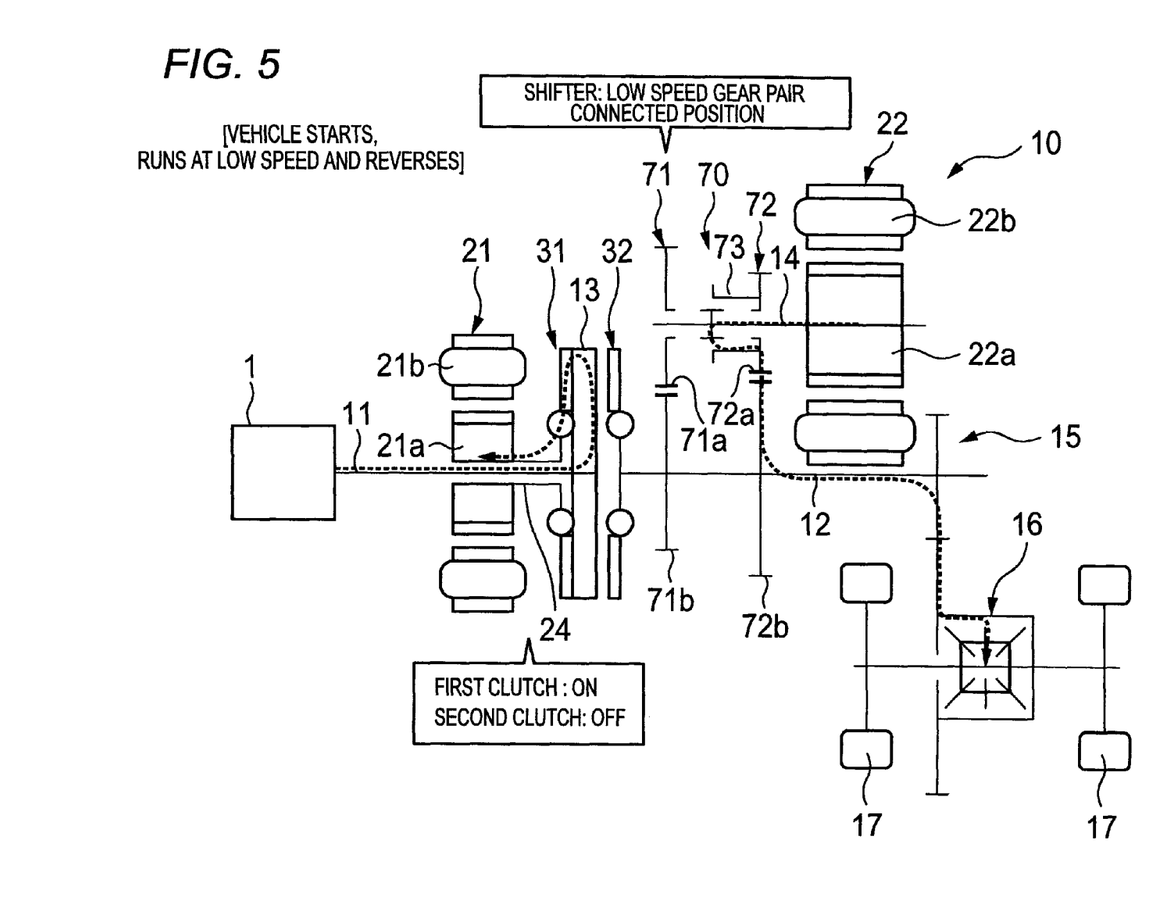
FIG. 5 is a schematic view showing torque transmission of a power transmission device for hybrid vehicle when the vehicle starts, runs at a low speed and runs in the reverse direction.

FIG. 3 is a schematic view of a power transmission device for hybrid vehicle 10 when the vehicle stops. As shown in FIG. 3, when the vehicle stops, the first clutch 31 is connected, the second clutch 32 is disconnected, and the shifter 73 is located at the low speed gear pair connected position.

Where a vehicle starts from the state, where the vehicle runs at a low speed after starting, where the vehicle reverses, a drive force of the second motor 22 is transmitted to the drive wheels 17 via the low speed gear pair 72, the final gear 15 and the differential gear 16 by driving the second motor 22 as shown by the arrow depicted by a broken line in FIG. 4. Also, where the vehicle reverses, the second motor 22 is driven in the reverse direction where it is assumed that the rotation direction of the second motor 22 is a normal direction when the vehicle runs forward, whereby a torque in the reverse direction is transmitted to the drive wheels 17.

Thus, when a vehicle stops, if the first clutch 31 is connected, the second clutch 32 is disconnected, and the shifter 73 is located at the low speed gear pair connected position, the vehicle can start without disconnecting and connecting the clutches 31 and 32 and changing over the shifter 73 when starting the vehicle.

In addition, if starting, low speed running after starting and reversing are carried out by using the second motor 22, the starting, low speed running after starting and reversing for which the engine 1 is inefficient is taken over by the second motor 22, wherein efficient running can be brought about.

Further, in this state, regenerative power generation is carried out by the second motor 22 using power from the drive wheels 17, where the batteries (not illustrated) can be charged.

Figure 6:
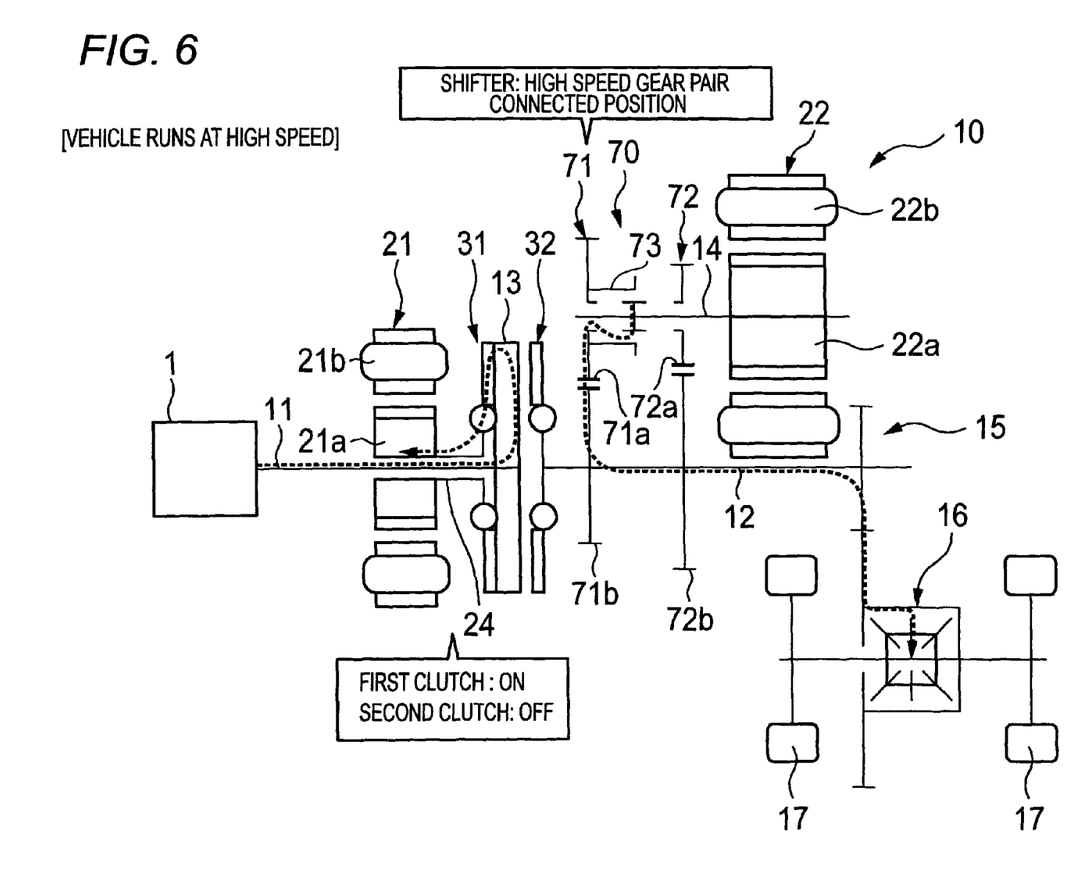
FIG. 6 is a schematic view showing torque transmission of a power transmission device for hybrid vehicle when the vehicle runs at a high speed.

Also, where the running load is large and the remaining capacity of the batteries is lowered when starting, running at a low speed after starting, and reversing, the engine 1 is driven with the first clutch 31 connected and the second clutch 32 disconnected. Thereby, the first motor 21 is driven, and ignition of the engine 1 by cranking the engine 1 can be brought about. And, after the engine 1 is brought into complete combustion, power of the engine 1 is used for regenerative power generation at the first motor 21, and the generated power is supplied to the second motor 22, whereby a drive force of the second motor 22 is transmitted to the drive wheels 17 via the low speed gear pair 72, the final gear 15 and the differential gear 16 as shown by the arrow depicted by a broken line in FIG. 4.

Where running at a higher speed from this state, the shifter 73 is further changed over from the low speed gear pair connected position to the high speed gear pair connected position. In further detail, the shifter 73 is located at the neutral position after the second motor 22 is controlled to zero torque, and the number of revolutions of the second motor 22 is controlled, wherein the shifter 73 is changed over to the high speed gear pair connected position after being synchronized. Therefore, it is possible to prevent a speed change shock from occurring in accordance with shift change. And, as shown by the arrow depicted by a broken line in FIG. 6, power of the engine 1 is used for regenerative power generation at the first motor 21, and the generated power is supplied to the second motor 22, wherein the drive force of the second motor 22 is transmitted to the drive wheels 17 via the high speed gear pair 71, the final gear 15, and the differential gear 16. Therefore, the torque transmitted from the second motor 22 to the driven shaft 12 can be adjusted by the transmission 70, and the second motor 22 can be downsized.

When running at a low speed after starting and when running at a constant speed including high speed running at a higher speed from the low speed running, power of the engine 1 is used for regenerative power generation at the first motor 21, and the generated power is supplied to the second motor 22. That is, so-called series running is carried out, whereby it is possible to respond to the cases where a running load is large and the remaining capacity of the batteries is lowered.

Figure 7:
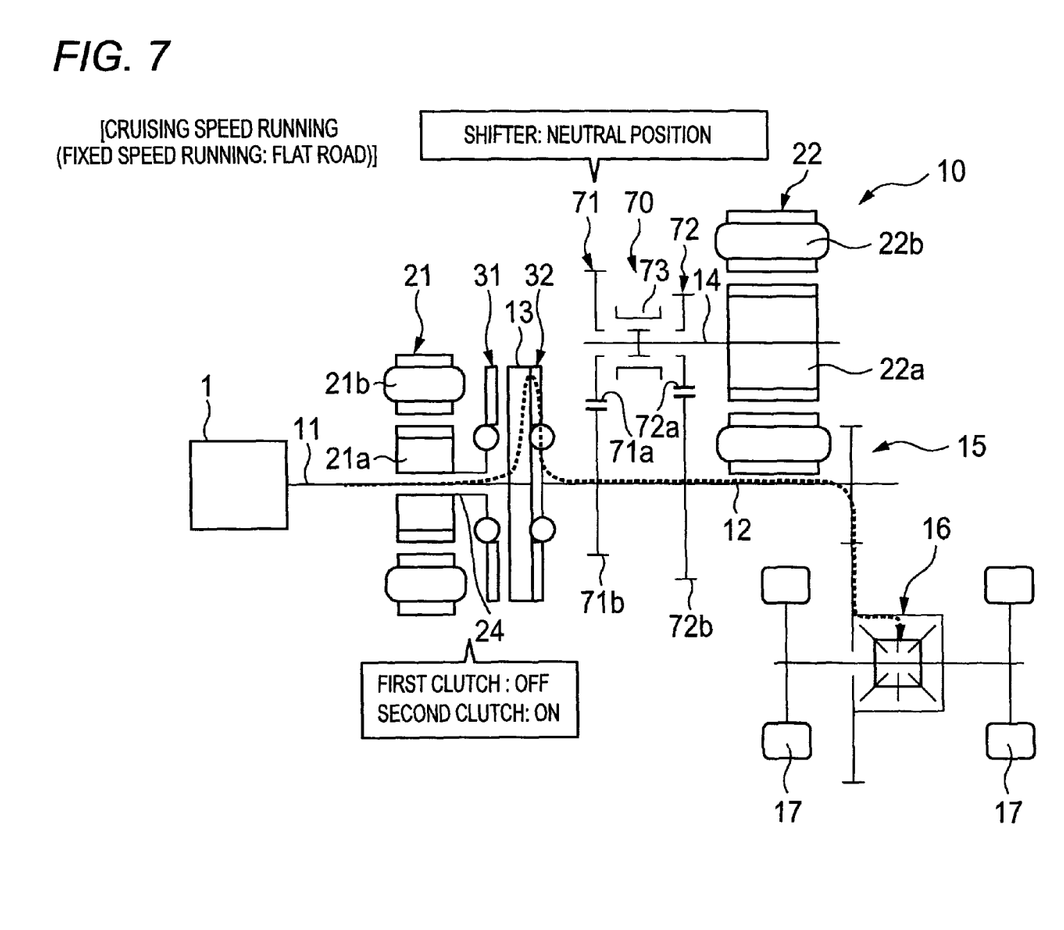
FIG. 7 is a schematic view showing torque transmission of a power transmission device for hybrid vehicle when the vehicle runs at a cruising speed (on a flat road)

When the vehicle runs at a cruising speed, the first clutch 31 is connected, and the second clutch 32 is connected from a state where the second clutch 32 is disconnected. In further detail, the second clutch 32 is connected after such control is carried out so as to match the number of revolutions of the engine 1 to that of the driven shaft 12. Also, running is enabled by power of the engine 1 by disconnecting the first clutch 31 and simultaneously changing over the shifter 73 to the neutral position. In further detail, running by the power of the engine 1 is carried out by disconnecting the first clutch 31 and moving the shifter 73 to the neutral position after the second motor 22 is controlled to zero torque. Accordingly, power transmission between the first motor 21 and the crankshaft 11 is disconnected, and the second motor 22 is disconnected from the driven shaft 12.

For example, in the case where running at a constant speed is possible such as running on a flat road, it is preferable that a vehicle runs by the engine 1, since the engine efficiency is satisfactory, wherein as shown by the arrow depicted by a broken line in FIG. 7, the drive force of the engine 1 is transmitted to the drive shaft 17 via the flywheel 13, the final gear 15 and the differential gear 16.

At this time, by disconnecting power transmission to the first motor 21 and the second motor 22, the first motor 21 and the second motor 22 are not rotated together with the first motor 21 and the second motor 22, thereby the load is lowered, and fuel consumption can be improved.

Figure 8:
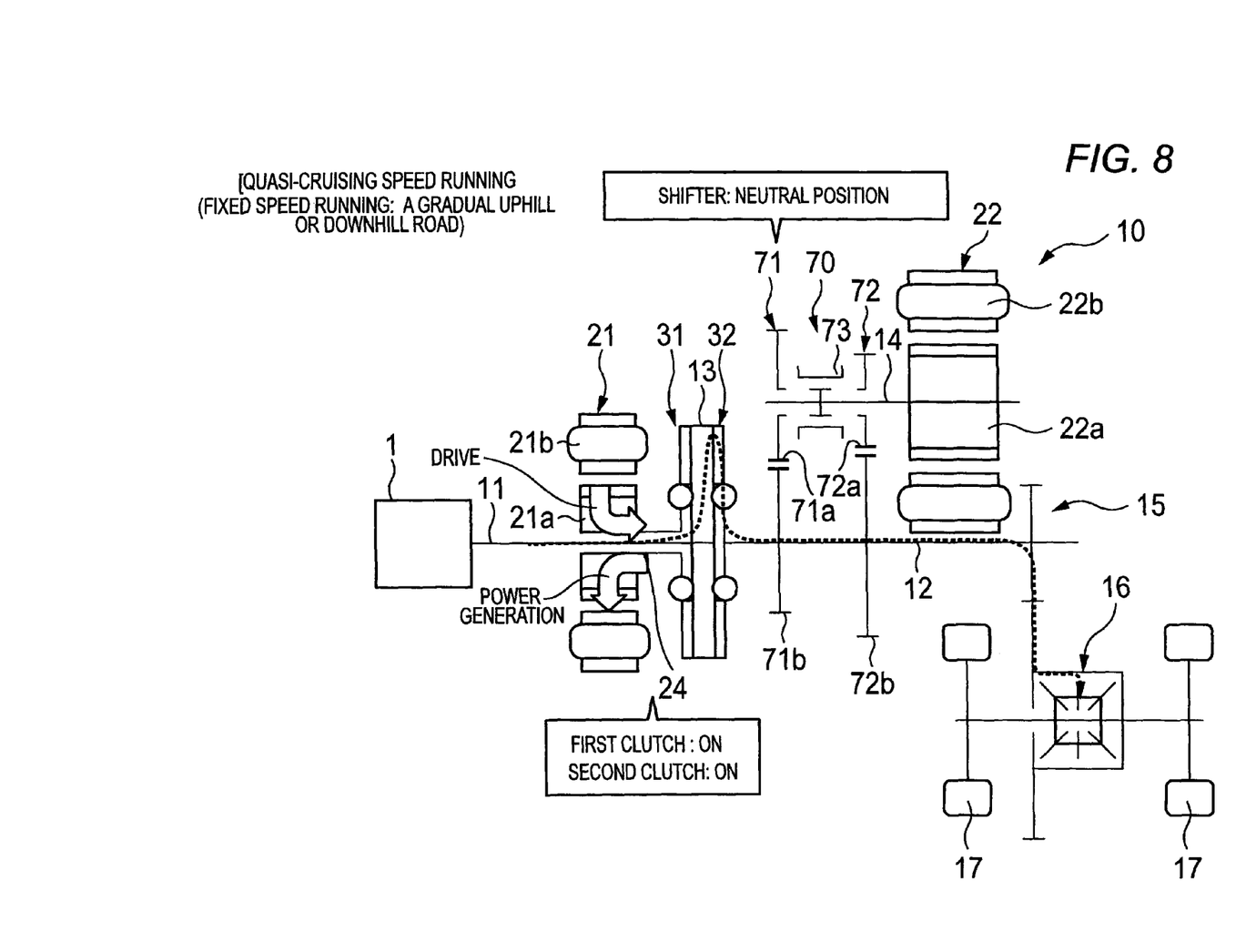
FIG. 8 is a schematic view showing torque transmission of a power transmission device for hybrid vehicle when the vehicle runs at a cruising speed (on a gradual uphill or downhill road)

In addition, when running at a quasi-cruising speed, for example, a gradual uphill or downhill road, the first clutch 31 may be connected in addition to the second clutch 32. In further detail, after the number of revolutions of the first motor 21 is controlled so as to be matched to the number of revolutions of the engine, the first clutch 31 is connected. Therefore, the first motor 21 is driven to assist the engine 1 or the first motor 21 is used for regenerative power generation for charging.

For example, when running on an uphill road in a state where the remaining capacity of the batteries is sufficient, the first motor 21 assists running by the engine 1, and when running on a downhill road in a state where the remaining capacity of the batteries is low, the first motor 21 is used for regenerative power generation for charging.

Further, when further torque is required, the shifter 73 is changed over from the neutral position to the high speed gear pair connected position. In further detail, after the number of revolutions transmitted from the second motor 22 to the driven shaft 12 via the high speed gear pair 71 is made roughly equal to the number of revolutions of the engine 1, the shifter 73 is changed over to the high speed connected position. Therefore, a vehicle can run at a drive force obtained by driving all of the engine 1, the first motor 21 and the second motor 22 and totalizing the drive forces thereof. Accordingly, the vehicle can correspond to high load running, and efficient running can be brought about.

With the power transmission device for hybrid vehicle 10 according to the present invention, which has been configured as described above, by connecting the second clutch 32, which disconnects and connects the engine 1 and the driven shaft 12, in a state where the first clutch 31 for disconnecting and connecting the engine 1 and the first motor 21 and the shifter 73 for disconnecting and connecting the second motor 22 and the driven shaft 12 are disconnected, it is possible to prevent the first motor 21 and the second motor 22 from rotating together with the engine 1 when running by the engine 1, wherein the load due to the first motor 21 and the second motor 22 rotating together with the engine 1 can be prevented from being increased, and it is possible to contribute to improvement in fuel consumption.

With the power transmission device for hybrid vehicle 10 according to the present invention, when a vehicle runs by the second motor 22, the second clutch 32 which disconnects and connects the engine 1 and the driven shaft 12 is disconnected, and the shifter 73 which disconnects and connects the second motor 22 and the driven shaft 12 is connected, wherein the load due to the engine 1 and the first motor 21 rotating together with the engine 1 can be prevented from being increased, and it is possible to contribute to improvement in fuel consumption.

In addition, with the power transmission device for hybrid vehicle 10 according to the present invention, since the first clutch 31 and the second clutch 32 are disposed at both sides of the flywheel 13 which equalizes changes in rotations of the engine 1, the space located at both sides of the flywheel 13 can be effectively utilized. Therefore, space can be saved, and actuators for controlling the clutches can be arranged in one place in comparison with a case where these two clutches are disposed apart from each other, wherein the hydraulic circuits and electric circuits can be simplified.

Furthermore, with the power transmission device for hybrid vehicle 10 according to the present invention, since the shifter 73 is provided in the transmission 70, it is possible to adjust torque transmitted from the second motor 22 to the driven shaft 12 by the transmission 70, wherein the second motor 22 can be downsized.

Still further, with the power transmission device for hybrid vehicle 10 according to the present invention, since the transmission 70 is provided with the high speed gear pair 71 and the low speed gear pair 72 the speed change ratios of which are different from each other, the second motor 22 can be efficiently utilized by selecting speed change gears in accordance with the situations.

In addition, with the power transmission device for hybrid vehicle 10 according to the present invention, it is possible to disconnect and connect the first clutch 31 and the second clutch 32 by controlling the position of the friction disk 42 of the first clutch 31 and the second clutch 32 which are secured so as to place and hold the flywheel 13 therebetween. Also, the first clutch 31 and the second clutch 32 may be controlled by, for example, hydraulic control.

In addition, with the power transmission device for hybrid vehicle 10 according to the present invention, if starting, low speed running after starting and reversing are carried out by using the second motor 22, the starting, low speed running after starting and reversing for which the engine 1 is inefficient are taken over by the second motor 22, wherein efficient running can be brought about.

Also, with the power transmission device for hybrid vehicle 10 according to the present invention, since the first clutch 31, the second clutch 32 and the shifter 73 are, respectively, connected when running under a high load, efficient running can be brought about by driving all of the engine 1, the first motor 21 and the second motor 22.

Further, with the power transmission device for hybrid vehicle 10 according to the present invention, regenerative power generation is carried out by the second motor 22 by connecting the shifter 73 when decelerating a vehicle speed, or regenerative power generation is carried out by either one or both of the first motor 21 and the second motor 22 by connecting the first clutch 31 and the second clutch 32, wherein efficient charging can be carried out.

Still further, with the power transmission device for hybrid vehicle 10 according to the present invention, the first motor 21 is driven or the first motor 21 is used for the regenerative power generation in accordance with situations by connecting the first clutch 31, wherein efficient running or charging can be carried out by selecting drive or regenerative power generation by the first motor 21 in accordance with situations.

In addition, with the power transmission device for hybrid vehicle 10 according to the present invention, since the engine 1 is started by driving the first motor 21 by disconnecting the second clutch 32 and connecting the first clutch 31 when starting the engine 1, the first motor 21 functions as a stator motor, wherein there is no need to mount the starter motor, the system can be downsized and lightened in weight, and the costs thereof can be lowered.

Also, with the power transmission device for hybrid vehicle 10 according to the present invention, since regenerative power generation is carried out at the first motor 21 by the engine 1 by connecting the first clutch 31 when a vehicle runs at a constant speed, and running is carried out by driving the second motor 22 via an appropriate speed change gear pair by the shifter 73 with the second clutch 32 disconnected, so-called series running is carried out, it is possible to respond to the cases where a running load is large when a vehicle runs at a constant speed, and the remaining capacity of the batteries is lowered.

Also, the present invention is not limited to those exemplarily described in the embodiment described above, and the present invention may be subjected to various modifications and variations within the scope not departing from the spirit of the present invention.

Furthermore, the present application is based on Japanese Patent Application (JP-A-2008-306230) filed on Dec. 1, 2008, and the description thereof is incorporated herein by reference.

REFERENCE SIGNS LIST

1 Engine (Internal combustion engine)
10 Power transmission device for hybrid vehicle
11 Crankshaft (Engine shaft)
12 Driven shaft
13 Flywheel
21 First motor (First electric motor)
22 Second motor (Second electric motor)
31 First clutch (First disconnecting and connecting unit)
32 Second clutch (Second disconnecting and connecting unit)
42 Friction disk
70 Transmission
71 High speed gear pair
72 Low speed gear pair
73 Shifter (Connection changing unit)

The invention claimed is:

1. A power transmission device for a hybrid vehicle, including an internal combustion engine, a first electric motor and a second electric motor, comprising:
   a flywheel, disposed between an engine shaft of the internal combustion engine and a driven by the engine shaft, the flywheel being connected with the engine shaft;
   a first disconnecting and connecting unit, disposed at an internal combustion engine side of the flywheel, configured to disconnect and connect power transmission between the internal combustion engine and the first electric motor;
   a second disconnecting and connecting unit, disposed at a driven shaft side of the flywheel, configured to disconnect and connect power transmission between the internal combustion engine and the driven shaft; and
   a connection changing unit configured to disconnect and connect power transmission between the second electric motor and the driven shaft.

2. The power transmission device for the hybrid vehicle according to claim 1, further comprising a transmission at the driven shaft side of the flywheel,
   wherein the connection changing unit is a shifter secured at the transmission, the shifter selecting a neutral state where power transmission is interrupted between the second electric motor and the driven shaft, and a speed change state where the second electric motor is connected to the driven shaft with the speed of the second electric motor changed.

3. The power transmission device for the hybrid vehicle according to claim 2, wherein the transmission includes at least two or more speed change gear pairs.

4. The power transmission device for the hybrid vehicle according to claim 1, wherein:
   a friction disk of the first disconnecting and connecting unit and a friction disk of the second disconnecting and connecting unit are provided so as to place and hold the flywheel therebetween; and
   by controlling the positions of the friction disks, the first disconnecting and connecting unit disconnects and connects power transmission between the internal combustion engine and the first electric motor, and the second disconnecting and connecting unit disconnects and connects power transmission between the internal combustion engine and the driven shaft.

5. The power transmission device for the hybrid vehicle according to claim 1, wherein when the hybrid vehicle is reversed, the second electric motor is driven in the reverse direction by disconnecting the second disconnecting and connecting unit and connecting the connection changing unit.

6. The power transmission device for the hybrid vehicle according to claim 1, wherein when running under a load, the hybrid vehicle is caused to run by driving all of the internal combustion engine, the first electric motor and the second electric motor by connecting the first disconnecting and connecting unit, the second disconnecting and connecting unit and the connection changing unit, respectively.

7. The power transmission device for the hybrid vehicle according to claim 1, wherein when decelerating the speed of the hybrid vehicle, regenerative power generation is carried out by the second electric motor by connecting the connection changing unit or is carried out by connecting the first disconnecting and connecting unit and the second disconnecting and connecting unit, or both thereof are carried out.

8. The power transmission device for the hybrid vehicle according to claim 1, wherein when the hybrid vehicle starts, the hybrid vehicle starts by the second electric motor by disconnecting the second disconnecting and connecting unit and simultaneously connecting the connection changing unit.

9. The power transmission device for the hybrid vehicle according to claim 1, wherein when driving the hybrid vehicle by the internal combustion engine, the connection changing unit is connected after the number of revolutions of the internal combustion engine is made roughly equal to the number of revolutions transmitted from the second electric motor to the driven shaft when connecting the connection changing unit.

10. The power transmission device for the hybrid vehicle according to claim 1, wherein when the hybrid vehicle runs by the second electric motor, the second disconnecting and connecting unit is connected after the number of revolutions transmitted from the second electric motor to the driven shaft is made roughly equal to the number of revolutions of the internal combustion engine when connecting the second disconnecting and connecting unit.

11. The power transmission device for the hybrid vehicle according to claim 1, wherein when the hybrid vehicle runs by the internal combustion engine, the first electric motor is driven or the first electric motor is used for regenerative power generation in accordance with the situations by connecting the first disconnecting and connecting unit.

12. The power transmission device for the hybrid vehicle according to claim 1, wherein when starting the internal combustion engine, the internal combustion engine is started by driving the first electric motor by disconnecting the second disconnecting and connecting unit and simultaneously connecting the first disconnecting and connecting unit.

13. The power transmission device for the hybrid vehicle according to claim 1, wherein when the hybrid vehicle runs at a constant speed, the first electric motor is used for regenerative power generation by the internal combustion engine by connecting the first disconnecting and connecting unit, and at the same time, the second electric motor is driven for the hybrid vehicle to run via an appropriate speed change gear pair by the connection changing unit by disconnecting the second disconnecting and connecting unit.

14. The power transmission device for the hybrid vehicle according to claim 1, wherein the flywheel is integral with the engine shaft.

* * * * *